(12) United States Patent
Obata et al.

(10) Patent No.: US 8,859,923 B2
(45) Date of Patent: Oct. 14, 2014

(54) INPUT APPARATUS

(75) Inventors: Yasutoshi Obata, Nagano (JP); Takemasa Tsuchiya, Nagano (JP)

(73) Assignee: Minebea Co., Ltd., Nagano (JP)

(*) Notice: Subject to any disclaimer, the term of this patent is extended or adjusted under 35 U.S.C. 154(b) by 208 days.

(21) Appl. No.: 13/276,418

(22) Filed: Oct. 19, 2011

(65) Prior Publication Data

US 2012/0103778 A1 May 3, 2012

(30) Foreign Application Priority Data

Oct. 29, 2010 (JP) ................ 2010-244840
Mar. 31, 2011 (JP) ................ 2011-080175

(51) Int. Cl.
*H03K 17/975* (2006.01)
*G06F 3/02* (2006.01)
*G06F 3/044* (2006.01)

(52) U.S. Cl.
CPC .............. *G06F 3/0202* (2013.01); *G06F 3/044* (2013.01)
USPC .......................................... 200/600; 362/612

(58) Field of Classification Search
USPC ............... 200/600, 310–314; 362/612–616
See application file for complete search history.

(56) References Cited

U.S. PATENT DOCUMENTS

| | | | | |
|---|---|---|---|---|
| 6,889,456 B2* | 5/2005 | Shibata et al. | ................. | 40/546 |
| 7,731,394 B2* | 6/2010 | Suzuki et al. | ................. | 362/330 |
| 7,752,791 B2* | 7/2010 | Misawa et al. | ................. | 40/546 |
| 7,891,828 B2* | 2/2011 | Nakamura | ................. | 362/23 |
| 7,967,495 B2* | 6/2011 | Kamiya et al. | ................. | 362/630 |
| 8,288,673 B2* | 10/2012 | Liu et al. | ................. | 200/600 |
| 8,355,004 B2* | 1/2013 | Sato et al. | ................. | 345/170 |
| 2006/0250354 A1 | 11/2006 | Takata et al. | | |
| 2008/0129701 A1 | 6/2008 | Murakami | | |
| 2008/0204417 A1 | 8/2008 | Pierce et al. | | |
| 2010/0156508 A1 | 6/2010 | Yato | | |
| 2010/0273534 A1 | 10/2010 | Strom | | |
| 2011/0102325 A1 | 5/2011 | Sato et al. | | |

FOREIGN PATENT DOCUMENTS

| | | | |
|---|---|---|---|
| JP | 2000-200137 A | 7/2000 |
| JP | 2006-128019 A | 5/2006 |
| JP | 2006-260971 A | 9/2006 |
| JP | 2007-164767 A | 6/2007 |
| JP | 2007-196501 A | 8/2007 |
| JP | 2008-140133 A | 6/2008 |
| JP | 2010-064356 A | 3/2010 |
| JP | 2010-153139 A | 7/2010 |
| JP | 2011-100259 A | 5/2011 |

* cited by examiner

*Primary Examiner* — Xuong Chung Trans
(74) *Attorney, Agent, or Firm* — Carrier Blackman & Associates, P.C.; Joseph P. Carrier; William D. Blackman

(57) ABSTRACT

An input apparatus including a layered body is provided. The layered body includes an electrostatic capacity type touch sensor, a character and symbol printed film, on which characters or symbols are printed, and a surface light emitting layer configured to illuminate the character and symbol printed film. The character and symbol printed film is arranged on an upper surface side of the surface light emitting layer, the touch sensor is arranged on a lower surface side of the surface light emitting layer, and an input operation surface that is positioned at an uppermost surface is flat.

19 Claims, 7 Drawing Sheets

INPUT APPARATUS

BACKGROUND OF THE INVENTION

1. Field of the Invention

The invention relates to an input apparatus that can be used for an input device such as a keyboard for a personal computer and a remote controller for an air conditioner and the like.

2. Description of the Related Art

There has been known an input apparatus which is applied to a so-called input device, with which an operator inputs instruction information with a finger, such as a keyboard for a personal computer and a remote controller for an air conditioner, a TV, an audio device and the like. As one kind of such input apparatus, there has been known an input apparatus in which a light transmissive electrostatic capacity type touch panel is interposed between a backlight and an instruction information input unit which functions as an input surface.

According to that input apparatus, the backlight is turned on to cause the light to penetrate the electrostatic capacity type touch panel and to display the light on the instruction information input unit through a light transmission unit having a shape of a character, a figure and the like formed on the input surface and an operator inputs necessary instruction information through the input surface.

In the meantime, a portable terminal has been also known which has an information display and input apparatus functioning as an information display unit for displaying information necessary for an operator, in addition to the function of the input surface functioning as the instruction information input unit (for example, refer to JP 2007-164767A).

SUMMARY

In the related-art input apparatus as described above firstly, the light transmissive touch panel is interposed between the input surface and the backlight. Such input apparatus having the touch panel may use an electrostatic capacity type touch panel. For an input apparatus having such structure, JP-2011-100259A suggests a technique of improving the usability of the input apparatus. In this technique, a structure which causes the light emitted from the backlight to penetrate the touch panel is required.

In the meantime, it is demanded an input apparatus which has a structure different from that described in JP-A-2011-100259A and which is capable of further improving usability thereof when using the touch panel. Specifically, it is demanded an input apparatus having improved usability which allows a user to approach a touch panel and to thus input not only an instruction corresponding to one position of the touch panel touched with one finger but also an instruction corresponding to a combination of a plurality of positions of the touch panel (for example, any three positions) touched with different fingers, thereby performing various input operations in a range of the touch panel.

However, in order to realize the function enabling the so-called multi-point simultaneous input as described above in the structure where the light emitted from the backlight is caused to penetrate the light transmissive touch panel, special deliberation is required and the cost is increased.

In the meantime, the portable information display and input apparatus described in JP 2007-164767A has a structure where a backlight is interposed between a flat display panel and a touch panel. The flat display panel itself has functions of displaying characters or symbols as the input information of the input apparatus and displaying information content corresponding to the input operation of the input information. Therefore, the flat display panel has to be configured by an expensive liquid crystal panel and the like. That is, this input apparatus has a structure that is essentially different from the structure of the above input apparatus of causing the light emitted from the backlight to penetrate the touch panel and displaying the light on the display surface.

Accordingly, the portable information display and input apparatus described in JP 2007-164767A does not have an object unique to the present invention, which is to provide an input apparatus not having a function of displaying the input result (information content responsive to the input operation) but having a function enabling the multi-point simultaneous input (multi touch) at low cost.

That is, an object of the present invention is to provide an input apparatus enabling a so-called multi-point simultaneous input at low cost.

According to an illustrative embodiment of the present invention, there is provided an input apparatus comprising a layered body, the layered body including: an electrostatic capacity type touch sensor; a character and symbol printed film, on which characters or symbols are printed; and a surface light emitting layer configured to illuminate the character and symbol printed film. The character and symbol printed film is arranged on an upper surface side of the surface light emitting layer, the touch sensor is arranged on a lower surface side of the surface light emitting layer, and an input operation surface that is positioned at an uppermost surface is flat.

According to another illustrative embodiment of the present invention, there is provided an input apparatus comprising a layered body, the layered body including: an electrostatic capacity type touch sensor; a half mirror, on which characters or symbols are printed; and a surface light emitting layer configured to illuminate the half mirror. The half mirror is arranged on an upper surface side of the surface light emitting layer, the electrostatic capacity type touch sensor is arranged on a lower surface side of the surface light emitting layer, and an input operation surface which is positioned at an uppermost surface is flat.

According to the above configuration, it is possible to provide an input apparatus enabling a so-called multi-point simultaneous input at low cost.

DETAILED DESCRIPTION

Figure 1:
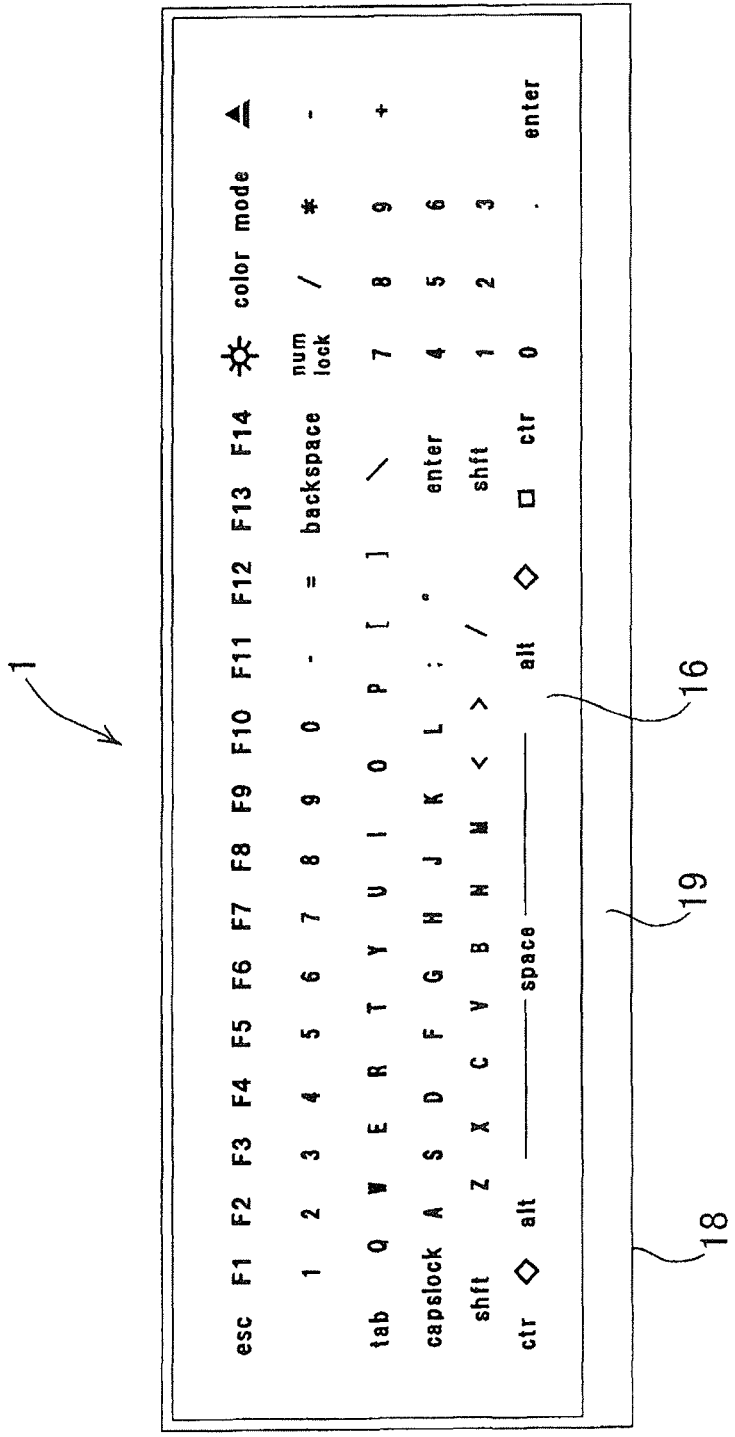
FIG. 1 is a plan view showing a display surface of an input apparatus according to an illustrative embodiment.
Figure 2:
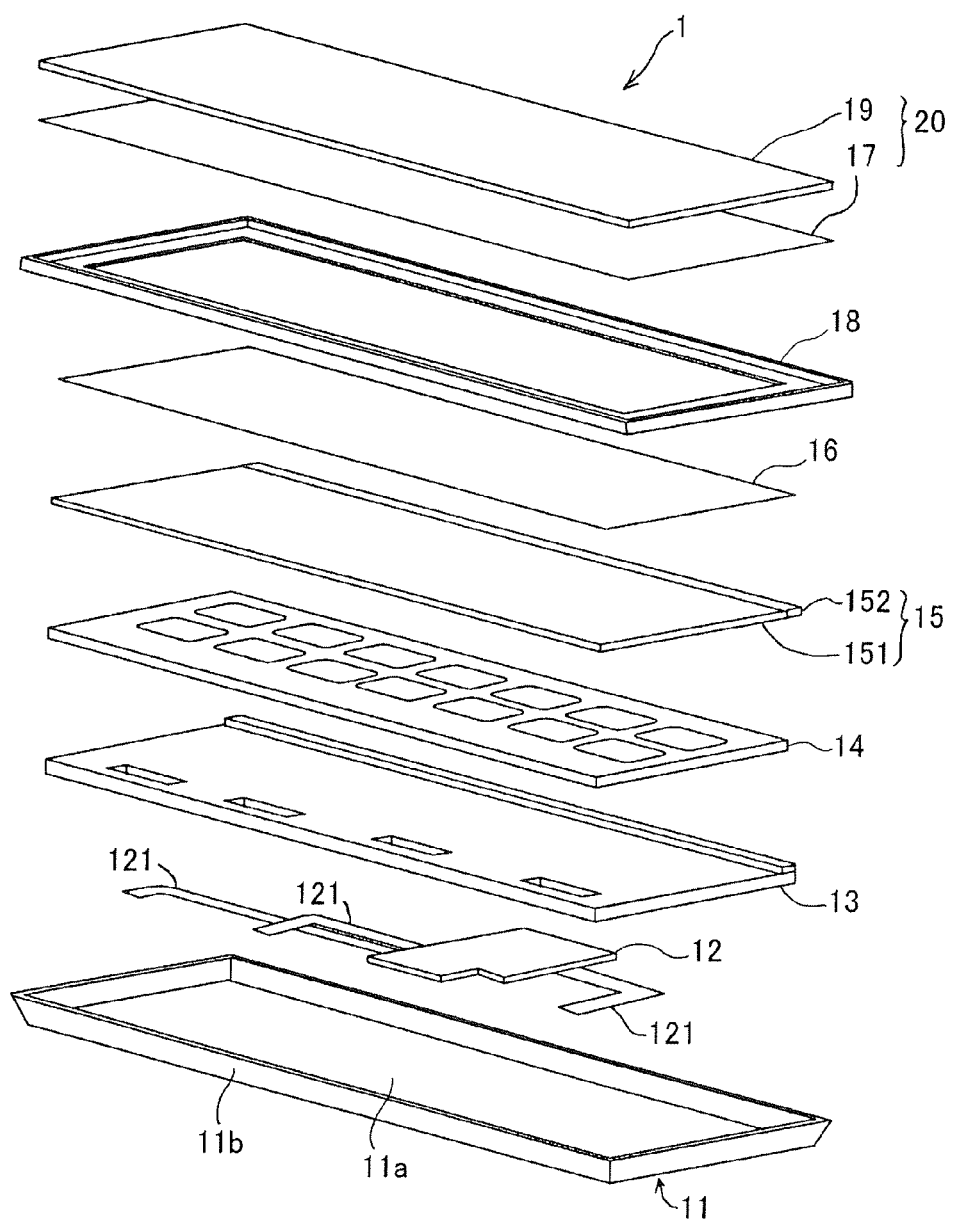
FIG. 2 is an exploded perspective view showing a state before the input apparatus shown in FIG. 1 is assembled.
Figure 3:
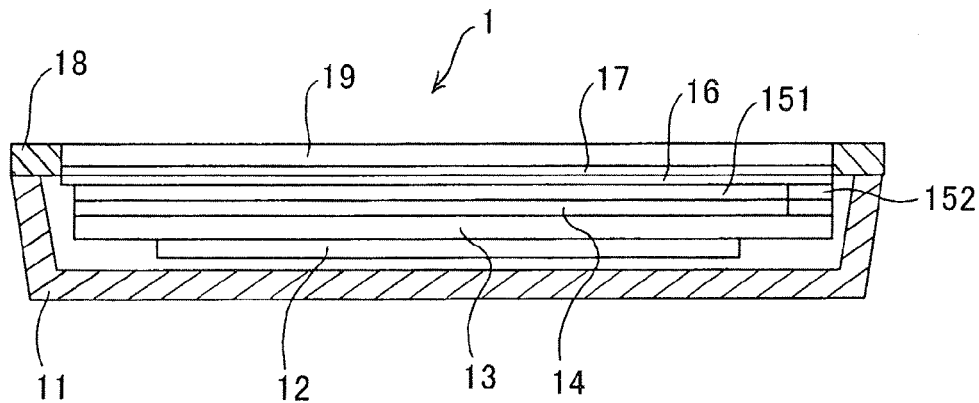
FIG. 3 schematically illustrates an internal structure of the input apparatus shown in FIG. 1.

Hereinafter, an input apparatus according to an illustrative embodiment of the present invention will be specifically described with reference to the drawings. FIG. 1 is a plan view showing a display surface of an input apparatus according to an illustrative embodiment. FIG. 2 is an exploded perspective view showing a state before the input apparatus shown in FIG. 1 is assembled. FIG. 3 schematically illustrates an internal structure of the input apparatus shown in FIG. 1, in which only a case and a frame are section-hatched.

An input apparatus 1 according to an illustrative embodiment of the present invention is a keyboard that is used for a personal computer. The input apparatus 1 includes a case 11, a base plate 13, a circuit substrate 12 that is arranged on a lower surface of the base plate 13, an electrostatic capacity type touch sensor 14 that is arranged on an upper surface of the base plate 13, a backlight (surface light emitting layer) 15, a character and symbol printed film 16, a frame 18, and a cover panel (input operation surface) 20 configured by a half mirror 17 and a light transmissive panel 19.

The case 11 is made of a resin having high strength and formability and has a bottom part 11a that is horizontally long and side parts 11b that are formed at peripheral edges of the bottom part 11a. The frame 18 is fitted to peripheral edges of the side parts 11b. The case bottom part 11a is provided at its lower surface with a foot (not shown) that adjusts a height of the keyboard 1 and an anti-slip member (not shown) that prevents the keyboard from being slipped on a table and the like on which the keyboard is put while operating the keyboard. The case bottom part 11a is provided at its upper surface with the circuit substrate 12 and an FPC (Flexible Printed Circuit) 121 for electrically processing and transmitting an operation signal of the keyboard 1 to a personal computer (not shown).

The base plate 13 is made of an ABS resin having a predetermined thickness and strength. The electrostatic capacity type touch sensor 14 and the backlight 15 are stacked on an upper surface of the base plate 13 in this order.

The electrostatic capacity type touch sensor 14 is manufactured by independently forming a plurality of electrostatic capacity sensor elements in a matrix form, which correspond to the respective characters and symbols printed on the character and symbol printed film 16, in a manner of forming a print substrate on a four-layered glass epoxy base material. Since the sensor can be manufactured by the manner of forming a print substrate, it is possible to considerably reduce the cost, compared to manufacturing a transmissive type touch panel. In the meantime, the electrostatic capacity sensor elements are respectively formed at positions corresponding to the respective characters and symbols printed on the character and symbol printed film 16. When an operator pushes with a finger a specific character or symbol of the characters and symbols which are projected on the cover panel 20, an electrostatic capacity of the electrostatic capacity sensor element corresponding to the specific character or symbol is changed by a large amount and electrostatic capacities of the surrounding electrostatic capacity sensor elements are changed by a small amount. Based on those changes, it is possible to specify which character or symbol the operator pushes with the finger by a calculation unit (not shown) of the circuit substrate 12.

According to the above configuration, even when the operator pushes a plurality of characters or symbols (for example, two or five characters or symbols) of the keyboard 1 at the same time, the electrostatic capacity type touch sensor 14 can specify the pushed characters or symbols simultaneously, i.e., can easily support a so-called multi touch. Therefore, the keyboard 1 can be used instead of a key switching-type keyboard that is widely used as a keyboard for a personal computer. In addition, an upper surface of the electrostatic capacity type touch sensor 14 is painted in white, so that it reflects leak light of the backlight 15, which is stacked on the sensor, into a light guide plate of the backlight 15 without absorbing the leak light.

The white painting is implemented by, for example, applying silkscreen printing on the upper surface of the electrostatic capacity type touch sensor 14. However, the present invention is not limited thereto, and a white reflective plate or reflective sheet may be attached instead. However, by performing a silkscreen printing with white after forming a pattern of the electrostatic capacity type touch sensor 14 on the glass epoxy substrate in the same process, it is possible to reduce the number of assembling processes and the number of parts and thus to increase the efficiency of production.

Figure 4:
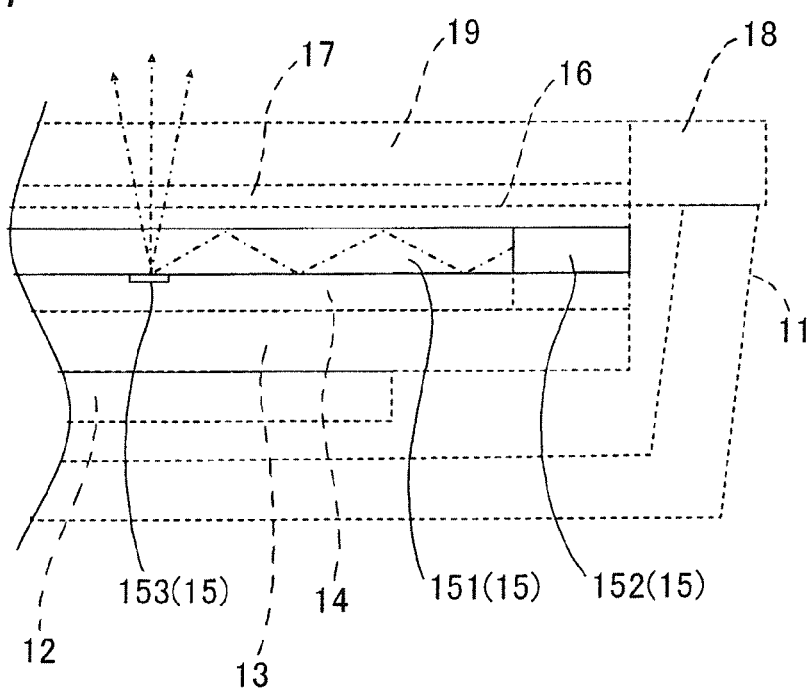
FIG. 4 is a sectional view illustrating a display method on the display surface of the input apparatus shown in FIG. 1.
Figure 5:
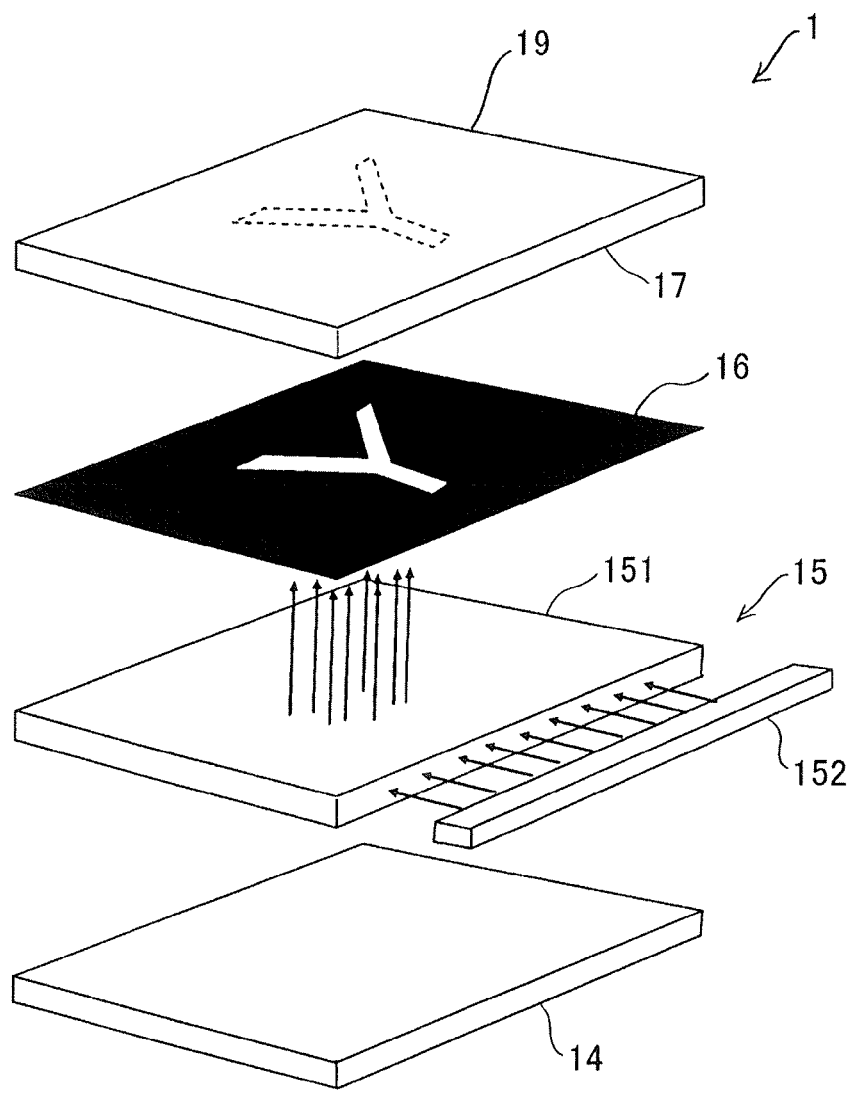
FIG. 5 is an exploded perspective view illustrating a display method on the display surface of the input apparatus shown in FIG. 1.

FIG. 4 is a sectional view illustrating a display method on the display surface of the input apparatus 1 shown in FIG. 1. FIG. 5 is an exploded perspective view illustrating a display method on the display surface of the input apparatus 1 shown in FIG. 1. The backlight 15 has a light guide plate 151 made of an acrylic resin and having a size and a planar shape to be stacked on the upper surface of the electrostatic capacity type touch sensor 14 and a plurality of LEDs 152, which function as a light source for emitting light to the light guide plate 151. The LEDs 152 are provided at a predetermined interval on a longitudinal side end of the light guide plate 151 at the front of the keyboard. Light path conversion parts 153 are provided on a bottom surface of the light guide plate 151 at positions corresponding to the characters or symbols printed on the character and symbol printed film 16. In FIG. 4, only one light path conversion part 153 is shown. The light path conversion parts 153 are formed by performing a special printing process called as a dot printing. More specifically, the light path conversion parts 153 is configured by a plurality of white dots locally formed on the bottom surface of the light guide plate 151 and are configured to reflect a part of the light transmitted in the light guide plate 151 at the respective dot parts, thereby directing the light toward the characters or symbols on the character and symbol printed film 16 corresponding to the respective light path conversion parts 153 (see arrows with dashed-dotted lines in FIG. 4 and arrows with solid lines in FIG. 5).

In the meantime, a formation density (number or size of dots formed per unit area) of the dot parts configuring the respective light path conversion parts 153 is higher as the light path conversion part is more distant from the LEDs 152. By changing the formation density of the dot parts, it is possible to cause the intensities of lights passing through the respective characters or symbols on the character and symbol printed film 16 to be uniform. Thereby, it is possible to prevent brightness difference on the operation input surface of the keyboard 1 depending on arrangement positions of the characters or symbols.

Figure 6A:
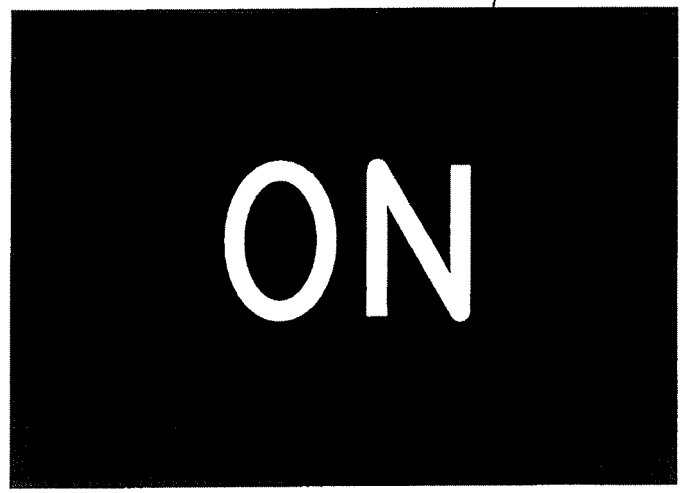
FIG. 6A shows a character and symbol printed film when seen from an operator side (surface side) and FIG. 6B shows the film when seen from an opposite side (backside) thereto.
Figure 6B:
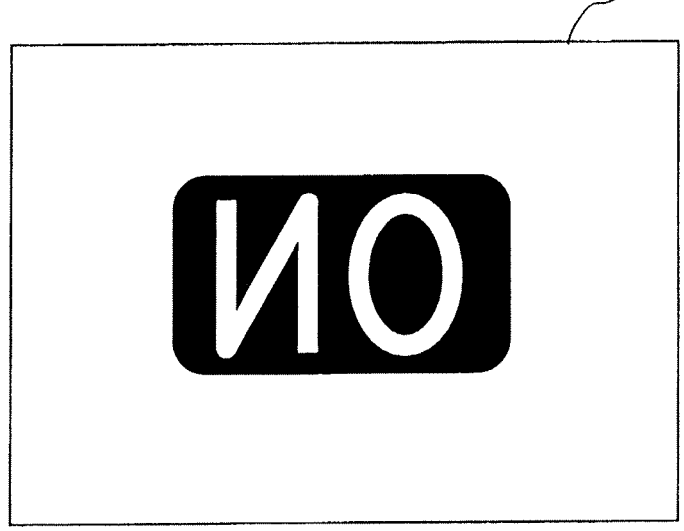

FIG. 6A shows the character and symbol printed film when seen from an operator side (surface side) and FIG. 6B shows the film when seen from an opposite side (backside) thereto. In FIG. 6, only one character "ON" of the plurality of characters and symbols is shown. The character and symbol printed film 16 is configured by a so-called negative film and the characters or symbols to be input through the keyboard 1 are displayed at positions corresponding to characters or symbols drawn on keycaps of a typical keyboard. A surface of the character and symbol printed film 16 is light transmissive such that the light can penetrate only the characters or symbols, and the other part of the surface is black-painted.

Specifically, the character and symbol printed film 16 is formed as follows: a transparent PET (polyethylene terephthalate) film is silkscreen printed with black except for parts corresponding to characters or symbols and is then subject to a double silkscreen printing (double printing) with white, so that when seen from the backlight, the film is white except for the transparent parts of the characters or symbols and the black parts surrounding the transparent parts (see FIG. 6B), and when seen from the operation information input side, the film is black except for the transparent parts of the characters or symbols (refer to FIG. 6A). Accordingly, since the light illuminated to the character and symbol printed film 16 is reflected without being absorbed in the white printed part, attenuation of the light in the light guide plate 151 is suppressed to the minimum, thereby keeping the light emitting efficiency of the backlight 15 high.

In this illustrative embodiment, the half mirror 17 is configured by not a metal sheet such as silver sheet but a special PET film made of a resin and having metallic luster so as to correctly detect whether an operator's finger touches the characters or symbols of the input operation surface 20 with the electrostatic capacity type touch sensor 14. The special PET film is known as a half mirror made of a resin and having metallic luster in JP 2010-184493A, for example.

The frame 18 is made of an ABS resin having excellent strength and formability and has a frame body structure. The frame 18 is configured to fit into the opening of the case 11 over an entire upper edge thereof while holding the cover panel 20 including the light transmissive panel 19 and the half mirror 17. The light transmissive panel 19 is configured by a plate member made of an acrylic resin, protects the half mirror 17. The light transmissive panel 19 has a thickness such that, when an operator pushes a specific character or symbol with a finger, a change in the electrostatic capacity due to the approaching of the finger in the electrostatic capacity sensor element corresponding to the specific character or symbol is appropriately generated. In this illustrative embodiment, the light transmissive panel 19 and the half mirror 17 configure the cover panel 20.

In the following, operations of the keyboard 1 of the illustrative embodiment different from the related-art technique are described. According to the keyboard 1 of this illustrative embodiment, since the character and symbol printed film 16 is arranged on the upper surface side of the backlight 15 and the electrostatic capacity type touch sensor 14 is arranged on the lower surface side of the backlight 15, it is not necessary to use a light transmissive touch panel, unlike the related-art technique. According to the related-art input apparatus, in order to realize the function enabling the so-called multi-point simultaneous input in a structure where the light emitted from the backlight is caused to penetrate the light transmissive touch panel, special deliberation is required and the cost is increased. However, according to the keyboard 1 of the illustrative embodiment, since it is not necessary to use a light transmissive touch panel, it is possible to realize an input apparatus enabling a multi-point simultaneous input at low cost.

In addition, according to the keyboard 1 of the illustrative embodiment, the cover panel 20 configuring the input operation surface positioned at the uppermost surface of the keyboard 1 is flat. Thus, if the keyboard of this illustrative embodiment is adopted instead of a relate-art keyboard having a plurality of keycaps, it is possible to easily clean the input operation surface and to prevent a case where the entire keyboard cannot be used even when only one keycap is damaged in the related-art keyboard.

In addition, it is possible to prevent dirt or dust from being accumulated between the keycaps and the keyboard front panel, unlike the relate-art keyboard. Thus, it is possible to use the keyboard of this illustrative embodiment under environments such as a clean room requiring strict cleanness, without any problem.

According to the keyboard 1 of this illustrative embodiment, since the cover panel 20 covering the upper surface of the character and symbol printed film 16 is further stacked and the upper surface of the cover panel 20 configures the input operation surface, it is possible to securely protect the character and symbol printed film itself by the cover panel 20. As a result, it is possible to easily clean the cover panel 20 of the keyboard 1, so that it is possible to use the keyboard for a long time while clearly projecting the characters or symbols which plays an important role as the operation input unit all the time.

According to the keyboard of this illustrative embodiment, the half mirror 17 is arranged below the light transmissive panel 19. Thus, when the keyboard is not used, the characters or symbols indicating the operation input information of the input operation surface cannot be seen from the outside, so that it is possible to realize a keyboard having an excellent appearance. In addition, when cleaning the light transmissive panel 19, the keyboard is turned off, so that the entire light transmissive panel becomes a mirror surface state or dark single color. Accordingly, it is possible to easily observe whether foreign substances are adhered when cleaning the keyboard, so that it is possible to efficiently clean the keyboard.

According to the input apparatus of this illustrative embodiment, since the light transmissive panel 19 is stacked on the half mirror 17 and the half mirror 17 is arranged at a side of the character and symbol printed film, the upper surface of the half mirror 17 is covered by the light transmissive panel 19. Therefore, it is possible to protect the half mirror 17 by the light transmissive panel 19, thereby keeping the outer quality of the keyboard high for a long time.

In the meantime, it is not necessarily required to apply the white ink on the entire upper surface of the electrostatic capacity type touch sensor 14. However, by adopting the configuration of this illustrative embodiment, it is possible to reflect the leak light, which comes from the backlight 15 stacked on the electrostatic capacity type touch sensor 14, into the light guide plate without absorbing the leak light, thereby increasing the light use efficiency of the backlight 15.

In addition, even when the cover panel 20 includes a smoke panel instead of the half mirror 17 in the above illustrative embodiment, the operational effects of the invention can be also realized. In other words, even when a smoke panel is used instead of the half mirror 17, the characters or symbols indicating the operation input information of the input operation surface cannot be seen from the outside when the input apparatus is not used. Therefore, it is possible to realize a keyboard having a luxurious design at low cost. In the meantime, instead of using the half mirror 17 or smoke panel for the cover panel 20, the other dielectric multilayered film may be used.

The light transmissive panel 19 made of an acrylic plate is not necessarily provided to the keyboard. In other words, the half mirror 17 itself may be configured as a flat input operation surface. However, when the light transmissive panel 19 is provided as the above illustrative embodiment, it is possible to securely protect the half mirror 17, to easily clean the keyboard and to keep the clean outer quality of the keyboard for a long time.

In addition, it is not necessarily required that the backside of the character and symbol printed film 16 is colored white except for the surrounding of the characters or symbols. However, when the backside is colored white as in the above illustrative embodiment, it is possible to reflect the leak light, which comes from the backlight 15 stacked below the character and symbol printed film 16, into the light guide plate without absorbing the leak light, thereby increasing the light use efficiency of the backlight 15.

The shapes or materials of the respective constitutional elements of the keyboard 1 are not limited to the above illustrative embodiment and can be changed within a scope capable of realizing the operational effects of the present invention. In the followings, first and second modified illustrative embodiments will be exemplarily described. In those modified illustrative embodiments, the configurations equivalent to the above illustrative embodiment are indicated with the same reference numerals and the descriptions thereof will be omitted.

Figure 7:
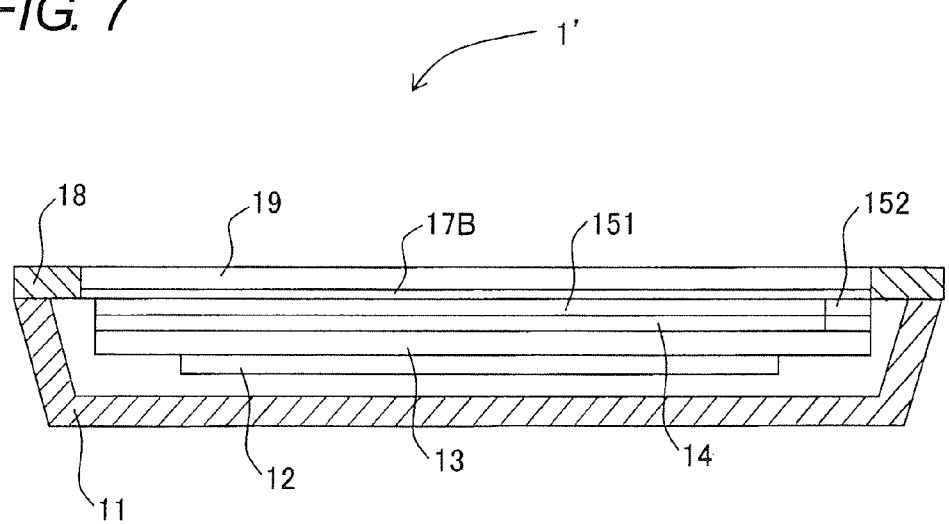
FIG. 7 is a sectional view showing an input apparatus according to a first modified illustrative embodiment.

First, an input apparatus 1' according to a first modified illustrative embodiment is described. FIG. 7 is a sectional view showing an input apparatus 1' according to a first modified illustrative embodiment of the present invention. In the above illustrative embodiment, the character and symbol printed film 16 is used. However, as shown in FIG. 7, in the input apparatus 1' of this modified illustrative embodiment, a processed half mirror 17B having a backside (side facing the backlight 15) on which characters and symbols are directly printed is used instead of the character and symbol printed film 16. Even with this modified illustrative embodiment having such a configuration, it is possible to realize the same operational effects as the character and symbol printed film 16. By doing so, it is not necessary to use the character and symbol printed film 16, so that it is possible to reduce the cost of parts and prime cost of the input apparatus 1'.

In the meantime, the light transmissive panel 19 made of an acrylic resin is not necessarily colorless and transparent. In other words, a colored panel may be used so as to provide a decorative effect. In addition, polycarbonate or glass may be used for the light transmissive panel 19, rather than the acrylic resin.

In addition, a special coating for scratch prevention, dirt prevention, fingerprint measure and the like may be provided on the surface of the light transmissive panel 19 or half mirror 17. Alternatively, a dedicated laminate film may be attached thereon.

The white dot printing has been performed on the light guide plate 151 that is used for the backlight 15, as the light path conversion part. However, for the purposes of the light path conversion part and the decorative effect, the dot shape may be changed or a colored dot printing may be used. In addition, the light guide plate 151 itself may be colored.

Figure 8:
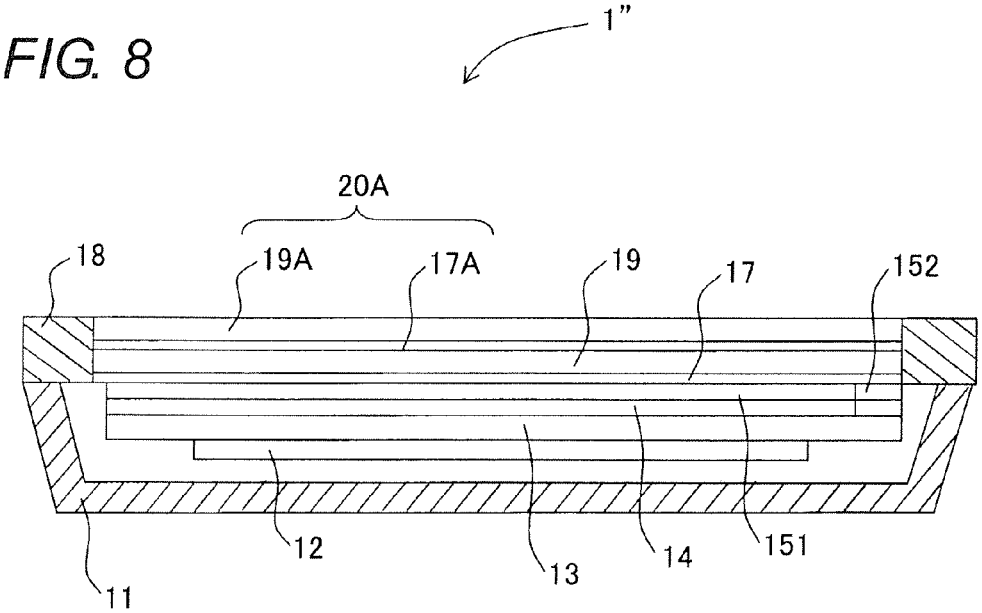
FIG. 8 is a sectional view showing an input apparatus according to a second modified illustrative embodiment.
Figure 9:
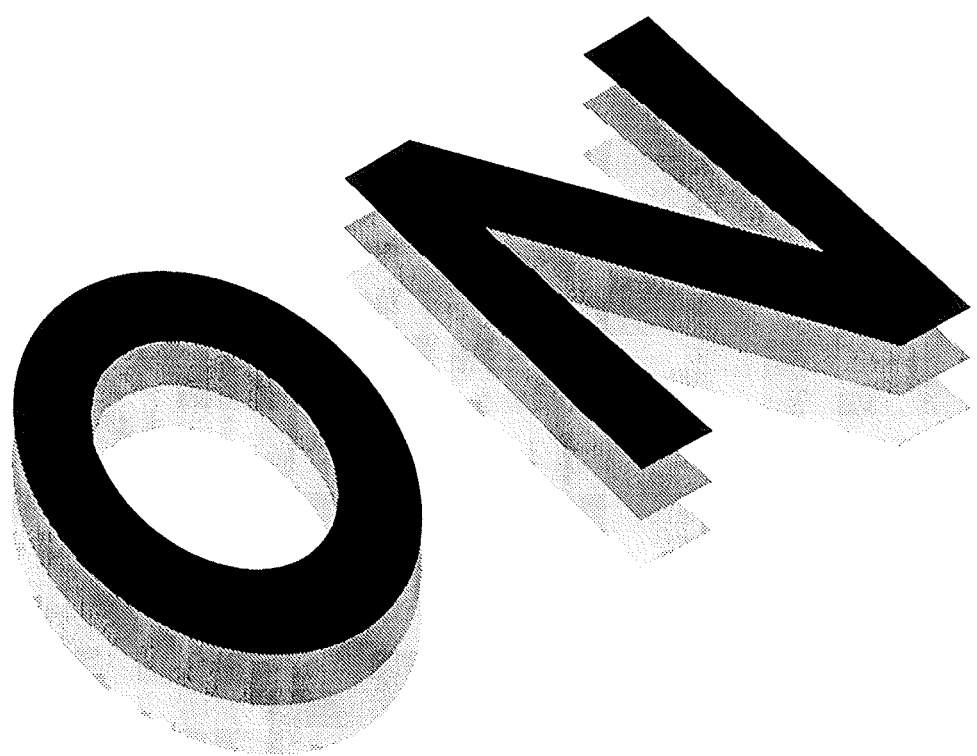
FIG. 9 is a schematic perspective view illustrating a display mode on a display surface of the input apparatus shown in FIG. 8.

Next, a second modified illustrative embodiment is described. FIG. 8 is a sectional view showing an input apparatus 1" according to a second modified illustrative embodiment of the present invention. FIG. 9 is a schematic perspective view illustrating a display mode on the display surface of the input apparatus 1" shown in FIG. 8.

According to the input apparatus 1" of this modified embodiment, as shown in FIGS. 8 and 9, a three-dimensional effect display member (second cover panel) 20A having a half mirror 17A attached on a backside of a light transmissive panel 19A is further stacked on the cover panel 20. Since the input apparatus 1" has the three-dimensional effect display member 20A, a character or symbol is displayed by a multiple reflection effect and seems to visually stand out. Thus, it is possible to cause the displayed character or symbol to be seen as three-dimensional. As a result, it is possible to improve the aesthetic or decorative effect of the input apparatus 1". In the meantime, a sense of depth of the displayed character or symbol may be adjusted by a thickness of the light transmissive panel 19A, the number of the three-dimensional effect display member (second cover panel) 20A, the reflectivity of the half mirror 17A and the like.

In addition, since the input apparatus 1" has the three-dimensional effect display member 20A, it is possible to allow a user to effectively see an image of a character or a symbol to be pushed, thereby preventing an erroneous input operation as much as possible. Also, even users who are not familiar with the input apparatus having a general keyboard style can have an interest in the input operation through the three-dimensional characters or symbols displayed on the input apparatus 1". In addition, by increasing the using frequency of the input apparatus 1", those users can conveniently use the input apparatus.

The three-dimensional effect display member 20A can be also applied to a general liquid crystal display (LCD). For this case also, it is possible to cause the displayed character or symbol to be seen as three-dimensional by the multiple reflection effect.

In the above illustrative embodiments, the keyboard 1 has been exemplified as an input apparatus. However, the present invention is not limited thereto. For example, the inventive concept of the present invention can be also applied to a remote controller for an air conditioner, a television, an audio device and the like.

As described above, an illustrative embodiment of the present invention provides an input apparatus having a flat input surface, in which the backlight 15 including combined the LEDs and the light guide plate is used to display the characters or symbols on the input surface and the electrostatic capacity type touch sensor 14 is arranged on the opposite side to the light emitting surface of the backlight 15, so that the device for input detection is arranged below the backlight 15.

According to this configuration, the characters or symbols formed on the character and symbol printed film are clearly projected on the flat panel which configures the input surface, through the light emitted from the backlight. By touching with a finger, the panel surface, which is a flat panel and functions as the input surface, the electrostatic capacity type touch sensor 14 arranged below the backlight 15 detects the input information. In other words, contrary to the relate-art input apparatus, in the input apparatus according to an illustrative embodiment of the present invention, a module such as an input sensor (for example, light transmissive touch panel), except for a light emitting function module, is not provided above the backlight 15. Therefore, it is possible to realize an input apparatus having a function enabling a multi-point simultaneous input (multi touch) at low cost.

What is claimed is:

1. An input apparatus comprising a layered body, the layered body including:
    an electrostatic capacity type touch sensor;
    a character and symbol printed film, on which a character or a symbol is printed;
    a surface light emitting layer configured to illuminate the character and symbol printed film, and
    a light transmissive cover panel which covers an upper surface of the character and symbol printed film, wherein the character and symbol printed film is arranged on an upper surface side of the surface light emitting layer,
wherein the touch sensor is arranged on a lower surface side of the surface light emitting layer,
wherein an input operation surface that is positioned at an uppermost surface is flat,
wherein an upper surface of the cover panel configures the input operation surface, and
wherein the cover panel includes either a half mirror which is made of a nonmetallic material or a smoke panel which is made of a nonmetallic material.

2. The input apparatus according to claim 1,
wherein the half mirror or the smoke panel is made of a resin.

3. The input apparatus according to claim 1,
wherein the cover panel includes a light transmissive panel, and the half mirror or the smoke panel is made of a resin and stacked on the light transmissive panel, and
wherein the cover panel is provided such that the half mirror or the smoke panel is arranged at a side of the character and symbol printed film.

4. The input apparatus according to claim 1,
wherein the cover panel includes at least one three-dimensional effect display member which includes a light transmissive panel and a half mirror.

5. The input apparatus according to claim 1,
wherein the cover panel includes a first cover panel and a second cover panel stacked on the first cover panel, the first cover panel being arranged at a side of the character and symbol printed film, and an upper surface of the second cover panel configures the input operation surface,
wherein the first cover panel includes a first light transmissive panel and either a first half mirror or a smoke panel stacked on the first light transmissive panel, and the first half mirror or the smoke panel is arranged at the side of the character and symbol printed film, and
wherein the second cover panel includes at least one three-dimensional effect display member which includes a second transmissive panel and a second half mirror stacked on the second transmissive panel, the second half mirror is arranged at the side of the character and symbol printed film.

6. The input apparatus according to claim 1,
wherein an upper surface of the electrostatic capacity type touch sensor is colored in white.

7. The input apparatus according to claim 1,
wherein the cover panel comprises a dielectric multilayered film.

8. An input apparatus comprising a layered body, the layered body including:
an electrostatic capacity type touch sensor;
a half mirror, on which a character or a symbol is printed; and
a surface light emitting layer configured to illuminate the half mirror,
wherein the half mirror is arranged on an upper surface side of the surface light emitting layer,
wherein the electrostatic capacity type touch sensor is arranged on a lower surface side of the surface light emitting layer, and
wherein an input operation surface which is positioned at an uppermost surface is flat.

9. The input apparatus according to claim 8,
wherein the layered body further includes:
a light transmissive cover panel which covers an upper surface of the half mirror, and
wherein an upper surface of the cover panel configures the input operation surface.

10. The input apparatus according to claim 9,
wherein the cover panel includes at least one three-dimensional effect display member which includes a light transmissive panel and a half mirror.

11. The input apparatus according to claim 8,
wherein the half mirror is made of a nonmetallic material.

12. The input apparatus according to claim 11,
wherein the half mirror is made of a resin.

13. The input apparatus according to claim 11,
wherein the half mirror is made of a dielectric multilayered film.

14. An input apparatus comprising:
an electrostatic capacity type touch sensor;
a half mirror having a first surface on which a character or a symbol is formed, the half mirror being made of a nonmetallic material; and
a surface light emitting layer configured to illuminate the half mirror, the surface light emitting layer being arranged between the electrostatic capacity type touch sensor and the half mirror, and
wherein an input operation surface which is positioned at an uppermost surface is flat.

15. The input apparatus according to claim 14,
wherein the first surface of the half mirror is opposed to the surface light emitting layer.

16. The input apparatus according to claim 14,
wherein the character or the symbol is printed on the first surface of the half mirror.

17. The input apparatus according to claim 14,
wherein the half mirror is made of a resin.

18. The input apparatus according to claim 14,
wherein the half mirror is made of a dielectric multilayered film.

19. The input apparatus according to claim 14,
wherein the half mirror having a second surface opposite to the first surface, the second surface being the input operation surface.

* * * * *